(12) United States Patent
Nakamura et al.

(10) Patent No.: US 6,269,087 B1
(45) Date of Patent: *Jul. 31, 2001

(54) HANDOVER TYPE JUDGEMENT SCHEME FOR CDMA MOBILE COMMUNICATION SYSTEM

(75) Inventors: Takehiro Nakamura, Yokosuka; Takaaki Sato, Yokohama, both of (JP)

(73) Assignee: NTT Mobile Communications Network Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,688

(22) Filed: Jun. 23, 1997

(30) Foreign Application Priority Data

Jun. 24, 1996 (JP) .................................... 8-163170

(51) Int. Cl.[7] ........................................ H04Q 7/00
(52) U.S. Cl. ........................ 370/331; 370/335; 455/437
(58) Field of Search .................. 370/320, 335, 370/342, 441, 319, 321, 322, 328, 329, 331, 332, 333; 455/436, 437, 439, 440, 442

(56) References Cited

U.S. PATENT DOCUMENTS

| | | | |
|---|---|---|---|
| 4,670,899 | * 6/1987 | Broday et al. | 455/436 |
| 5,117,502 | * 5/1992 | Onoda et al. | 455/436 |
| 5,241,685 | * 8/1993 | Bodin et al. | 455/436 |
| 5,257,402 | 10/1993 | Crisler . | |
| 5,317,623 | * 5/1994 | Sakamoto et al. | 455/436 |
| 5,345,467 | * 9/1994 | Lomp et al. | 370/335 |
| 5,392,331 | * 2/1995 | Patsiokas et al. | 455/436 |
| 5,434,853 | * 7/1995 | Hemmady et al. | 370/335 |
| 5,440,613 | * 8/1995 | Fuentes | 455/436 |
| 5,483,669 | * 1/1996 | Barnett et al. | 455/436 |
| 5,487,083 | * 1/1996 | Nakajima et al. | 455/436 |
| 5,794,149 | * 8/1998 | Hoo | 455/436 |
| 5,910,944 | * 6/1999 | Callicotte et al. | 370/335 |
| 5,930,170 | * 7/1999 | Sawyer et al. | 455/436 |

FOREIGN PATENT DOCUMENTS

| | | |
|---|---|---|
| 6-326652 | 11/1994 | (JP) . |
| 8-149551 | 6/1996 | (JP) . |
| WO 95/16329 | 6/1995 | (WO) . |
| WO 96/02117 | 1/1996 | (WO) . |

* cited by examiner

Primary Examiner—Chau Nguyen
Assistant Examiner—Soon-Dong Hyun
(74) Attorney, Agent, or Firm—Oblon, Spivak, McClelland, Maier & Neustadt, P.C.

(57) ABSTRACT

A handover type judgement scheme for a CDMA mobile communication system which is capable of judging an appropriate type of handover from multiple types of handover available. At the mobile station, one type of handover for which a handover start condition is weakest among available types of handover is judged. Then, whether the handover start condition for that one type of handover is satisfied or not is checked, and each base station for carrying out that one type of handover is notified when the handover start condition for said one type of handover is satisfied.

36 Claims, 3 Drawing Sheets

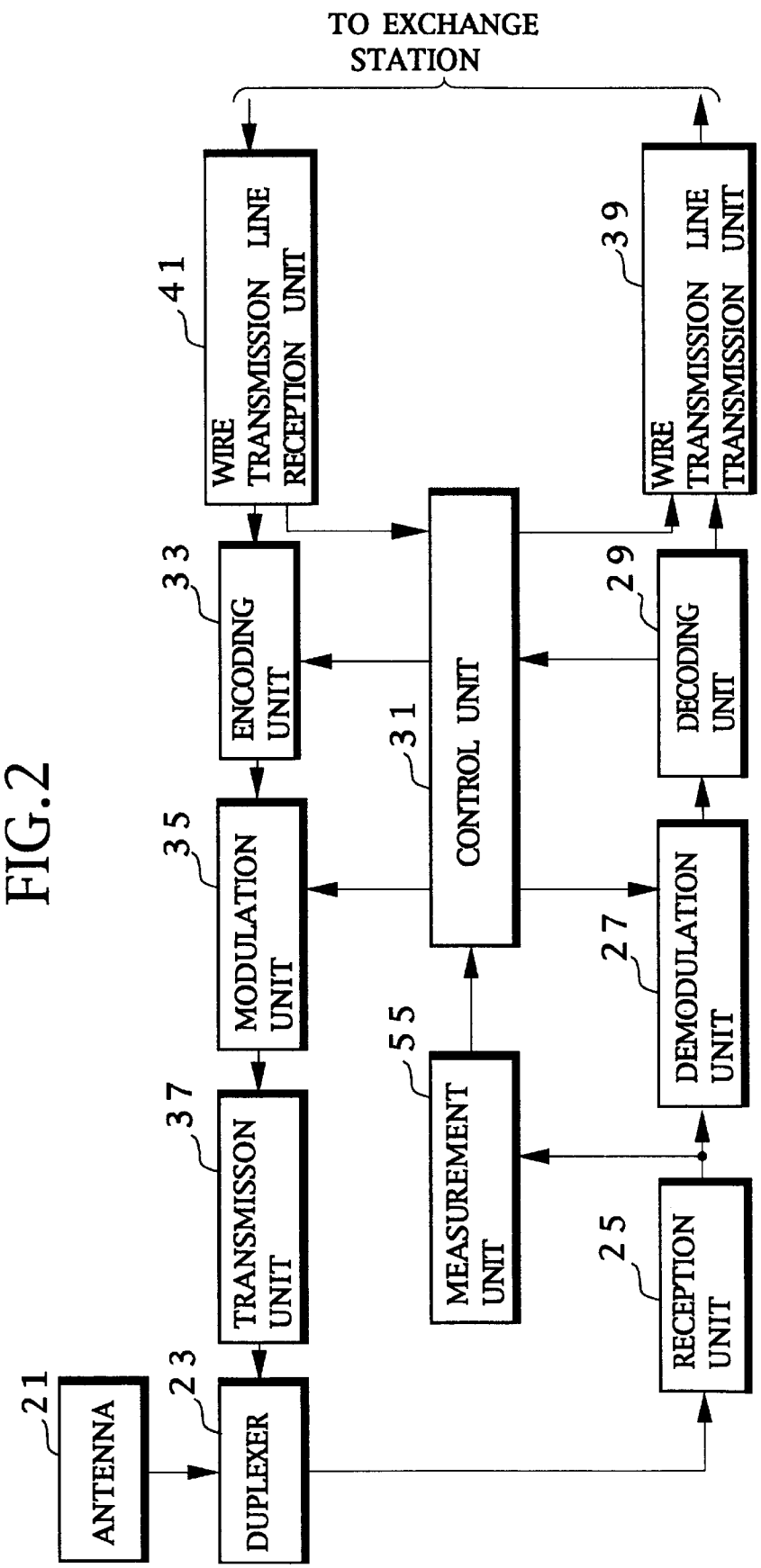

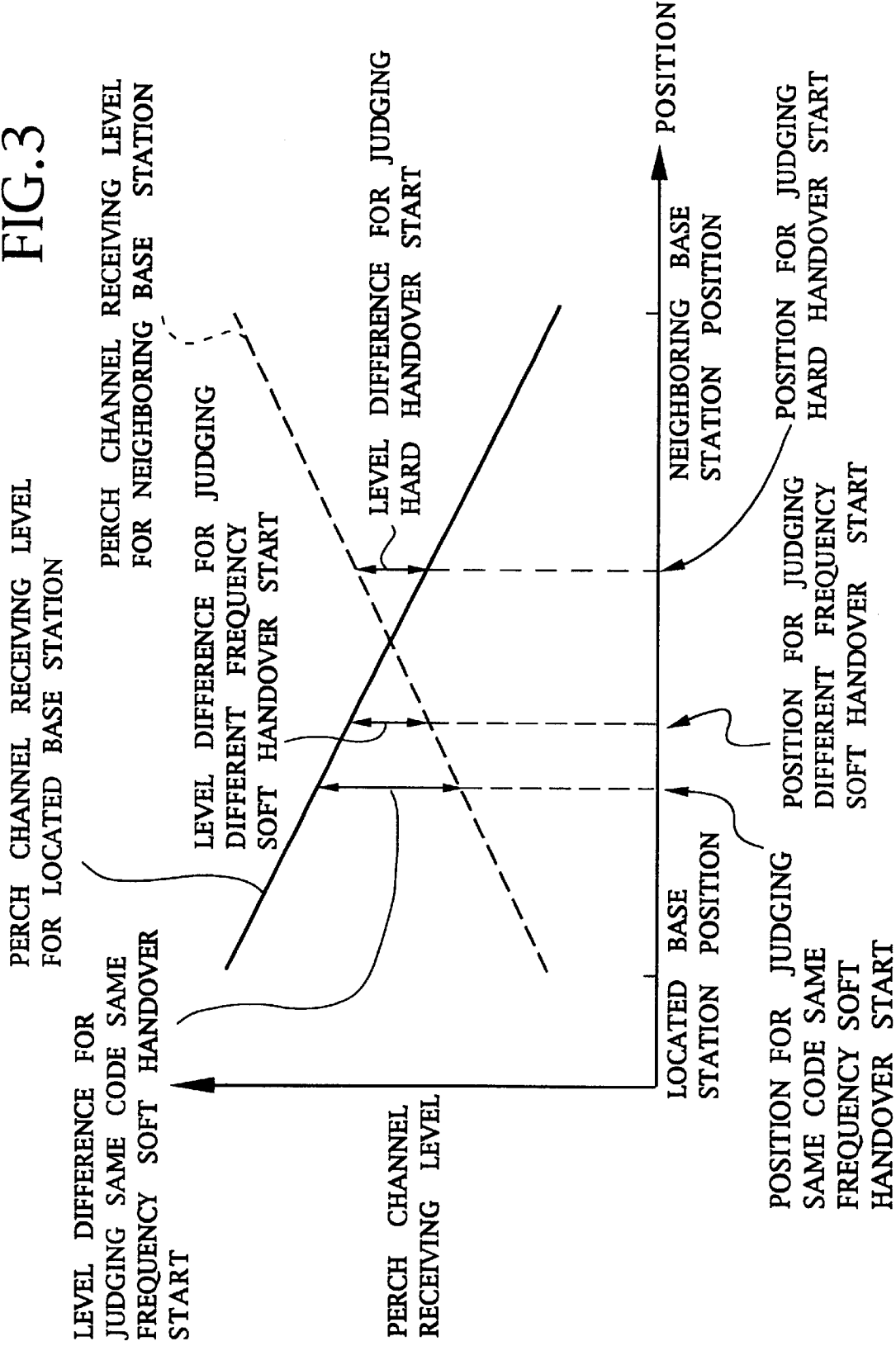

HANDOVER TYPE JUDGEMENT SCHEME FOR CDMA MOBILE COMMUNICATION SYSTEM

BACKGROUND OF THE INVENTION

1. Field of the Invention

The present invention relates to a handover type judgement scheme for a CDMA (Code Division Multiple Access) mobile communication system which is capable of carrying out any of multiple types of handover with different handover start conditions at a time of handover in which a mobile station moves from a currently communicating base station to another base station.

2. Description of the Background Art

In the conventional mobile communication system such as PDC (Personal Digital Cellular) system that is currently providing the mobile communication service in Japan, there is only one available type of handover called hard handover.

In contrast, in the CDMA mobile communication system, the soft handover in also available in addition to the hard handover, and this soft handover further includes multiple types of soft handovers such as the same code same frequency soft handover and the different frequency soft handover. Here, these multiple types of handovers are associated with mutually different handover start conditions.

In order for each mobile station to carry out the handover properly, each base station is transmitting the perch channel (or the pilot channel). The mobile station receives the perch channel transmitted from each base station of each nearby cell, compares the receiving level of the perch channel received from each nearby cell with the receiving level of the perch channel of a currently located cell, and judges the start of the handover according to the obtained difference.

Here, as already mentioned above, the available types of handover includes the hard handover, the same code same frequency soft handover, and the different frequency soft handover, and the handover start conditions for these three types of handover are as indicated in FIG. 3. As can be seen from FIG. 3, when an influence on the radio channel capacity is taken into account, the handover start condition is weakest for the same code same frequency soft handover, second weakest for the different frequency soft handover, and strongest for the hard handover.

As already mentioned above, the conventional mobile communication system has been designed to use only one type of handover, so that there has been no means for judging an appropriate type of handover to be executed out of multiple types of handover.

SUMMARY OF THE INVENTION

It is therefore an object of the present invention to provide a handover type judgement scheme for a CDMA mobile communication system which is capable of judging an appropriate type of handover from multiple types of handover available.

According to one aspect of the present invention there is provided a handover type judgement method for a CDMA mobile communication system which is capable of carrying out any of multiple types of handover with different handover start conditions, the method comprising the steps of: judging one type of handover for which a handover start condition is weakest among available types of handover at a mobile station; and checking whether the handover start condition for said one type of handover is satisfied or not at the mobile station, and notifying each base station for carrying out said one type of handover when the handover start condition for said one type of handover is satisfied.

According to another aspect of the present invention there is provided a CDMA mobile communication system for carrying out any of multiple types of handover with different handover start conditions, comprising: a plurality of base stations; and at least one mobile station having: a judging unit for judging one type of handover for which a handover start condition is weakest among available types of handover; and a checking unit for checking whether the handover start condition for said one type of handover is satisfied or not, and notifying each base station for carrying out said one type of handover when the handover start condition for said one type of handover is satisfied.

According to another aspect of the present invention there is provided a mobile station apparatus for use as a mobile station in a CDMA mobile communication system for carrying out any of multiple types of handover with different handover start conditions, the apparatus comprising: a judging unit for judging one type of handover for which a handover start condition is weakest among available types of handover; and a checking unit for checking whether the handover start condition for said one type of handover is satisfied or not, and notifying each base station for carrying out said one type of handover when the handover start condition for said one type of handover is satisfied.

According to another aspect of the present invention there is provided a base station apparatus for use as a base station in a CDMA mobile communication system for carrying out any of multiple types of handover with different handover start conditions, the apparatus comprising: a measuring unit for measuring a radio channel state for each cell/sector of the base station; a determining unit for determining each impossible type of handover that cannot be carried out for each cell/sector by the base station according to the radio channel state measured by the measuring unit; and a notifying unit for notifying an information indicating said each impossible type of handover to a mobile station, so that at a time of handover with respect to the base station, the mobile station judges one type of handover for which a handover start condition is weakest among available types of handover which include said multiple types of handover except for said each impossible type of handover according to said information, checks whether the handover start condition for said one type of handover is satisfied or not, and notifies each base station for carrying out said one type of handover when the handover start condition for said one type of handover is satisfied.

According to another aspect of the present invention there is provided a base station apparatus for use as a base station in a CDMA mobile communication system for carrying out any of multiple types of handover with different handover start conditions including a same code same frequency soft handover and a different frequency soft handover, the apparatus comprising: a measuring unit for measuring an interference receiving level or a total receiving level of each frequency bandwidth that is implemented at the base station for each cell/sector of the base station; and a notifying unit for notifying an information indicating that one frequency bandwidth cannot be used for one cell/sector to a mobile station, when a measured value for said one frequency bandwidth and said one cell/sector is greater than a prescribed threshold value, so that at a time of handover with respect to said one cell/sector while the mobile station is currently using said one frequency bandwidth as indicated by said information, the mobile station judges the different frequency soft handover as having a weakest handover start condition among available types of handover, checks whether the handover start condition for the different frequency soft handover is satisfied or not without checking the handover start condition for the same code same frequency soft handover with respect to said one cell/sector, and notifies each base station for carrying out the different frequency soft handover when the handover start condition for the different frequency soft handover is satisfied.

Other features and advantages of the present invention will become apparent from the following description taken in conjunction with the accompanying drawings.

BRIEF DESCRIPTION OF THE DRAWINGS

FIG. 2 is a block diagram of a base station apparatus for realizing a handover type judgement scheme for a CDMA mobile communication system according to the present invention.

FIG. 3 is a graph for explaining handover start conditions for three types of handover used in a handover type judgement scheme for a CDMA mobile communication system according to the present invention.

DETAILED DESCRIPTION OF THE PREFERRED EMBODIMENTS

Figure 1:
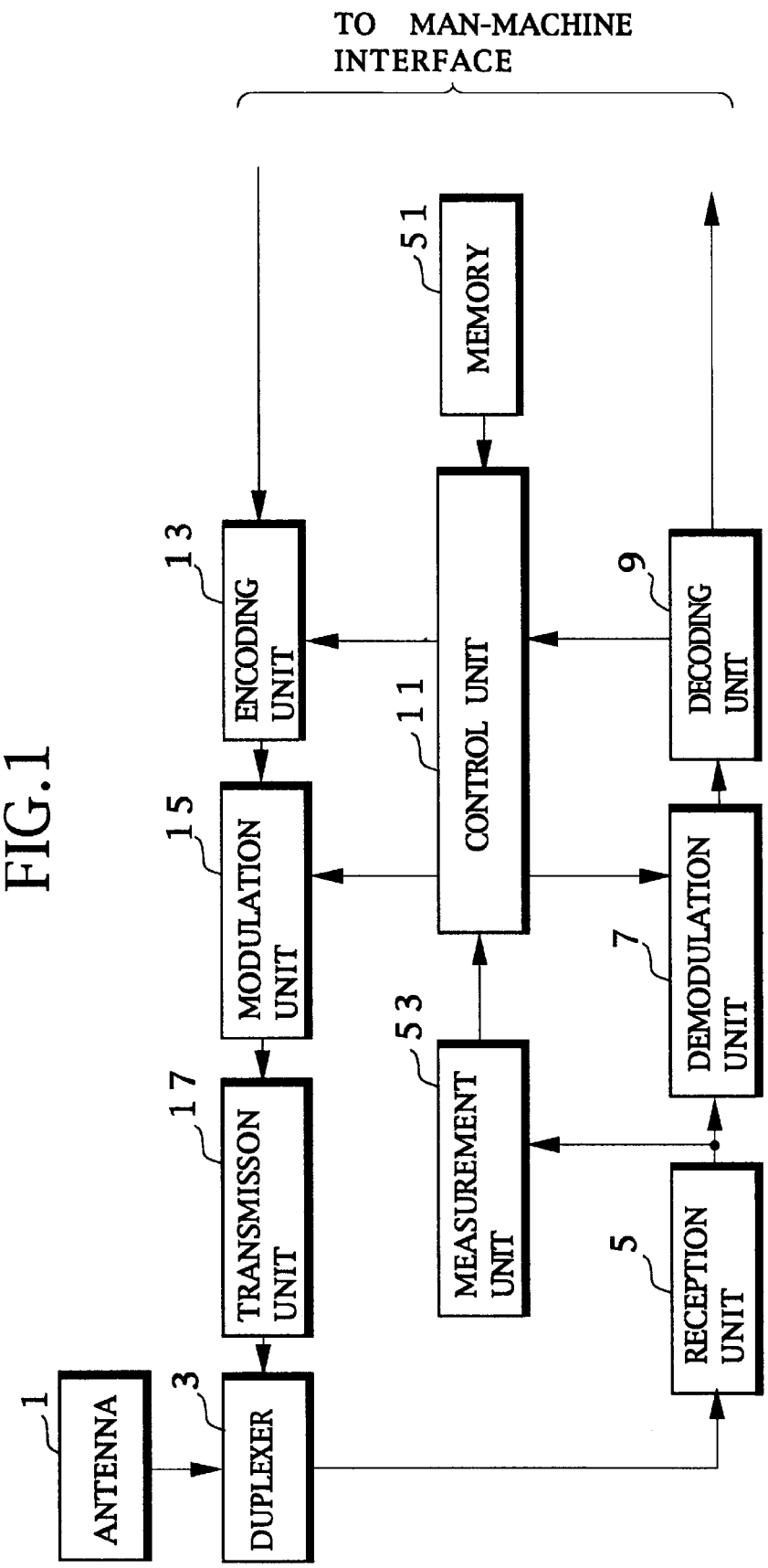
FIG. 1 is a block diagram of a mobile station apparatus for realizing a handover type judgement scheme for a CDMA mobile communication system according to the present invention.

Referring now to FIG. 1 to FIG. 3, various embodiments of a handover type judgement scheme for a CDMA mobile communication system according to the present invention will be described in detail.

FIG. 1 and FIG. 2 respectively show a mobile station apparatus and a base station apparatus for realizing the handover type judgement scheme for a CDMA mobile communication system according to the present invention.

The mobile station apparatus of FIG. 1 has an antenna 1 for receiving radio signals from base stations and transmitting radio signals to base stations. The signals from base stations received by the antenna 1 are supplied to a demodulation unit 7 through a duplexer 3 and a reception unit 5, and applied with the despreading using a spread code and the usual demodulation at this demodulation unit 7. The demodulated signals are then supplied to a decoding unit 9 which decodes the demodulated signals into transmission signals and control signals. The decoded control signals are supplied to a control unit 11, while the decoded transmission signals are supplied to a man-machine interface (not shown).

On the other hand, transmission signals such as speech signals from the man-machine interface are supplied to an encoding unit 13 along with the control signals from control unit 11, encoded at this encoding unit 13, applied with the primary modulation and the spreading using a spread code at a modulation unit 15, and then transmitted to base stations from the antenna 1 through a transmission unit 17 and the duplexer 3.

In addition, the mobile station apparatus of FIG. 1 also has a memory 51 connected to the control unit 11, which stores different handover start conditions for multiple types of handover along with an order of weakness among these handover start conditions, where the multiple types of handover includes the same code same frequency soft handover, the different frequency soft handover, and the hard handover. The CDMA mobile communication system of this embodiment is capable of carrying out any of these multiple types of handover. In addition, the memory 51 is also capable of storing an unexecutable handover type which is to be notified from a base station as will be described in detail below.

Moreover, the mobile station apparatus of FIG. 1 also has a measurement unit 53 provided between the reception unit 5 and the control unit 11, which measures a total receiving level or an interference receiving level of a frequency bandwidth by which this mobile station is currently communicating with base stations, and supplies the measured value to the control unit 11.

The base station apparatus of FIG. 2 has an antenna 21 for receiving radio signals from mobile stations and transmitting radio signals to mobile stations. The signals from mobile stations received by the antenna 21 are supplied to a demodulation unit 27 through a duplexer 23 and a reception unit 25, and applied with the despreading using a spread code and the usual demodulation at this demodulation unit 27. The demodulated signals are then supplied to a decoding unit 29 which decodes the demodulated signals into transmission signals and control signals. The decoded control signals are supplied to a control unit 31, while the decoded transmission signals are transmitted to an upper level exchange station (not shown) through a wire transmission line transmission unit 39.

On the other hand, transmission signals from the exchange station are received by a wire transmission line reception unit 41, and decomposed into the transmission signals and the control signals. The decomposed control signals are supplied to the control unit 31, while the decomposed transmission signals are encoded at an encoding unit 33, applied with the primary modulation and the spreading using a spread code at a modulation unit 15, and then transmitted to mobile stations from the antenna 21 through a transmission unit 7 and the duplexer 23.

Moreover, the base station apparatus of FIG. 2 also has a measurement unit 55 provided between the reception unit 25 and the control unit 31, which measures a radio channel state for each cell/sector, or a total receiving level or an interference receiving level of each frequency bandwidth implemented at this base station for each cell/sector, and supplies the measured value to the control unit 31.

In the mobile communication system having the mobile station device of FIG. 1 and the base station of FIG. 2 as described above, it is possible to carry out any of the multiple types of handover including the same code same frequency soft handover, the different frequency soft handover, and the hard handover, under different handover start conditions as indicated in FIG. 3.

Now, in one embodiment of a handover type judgement scheme according to the present invention, the mobile station judges and selects a handover type which has the weakest handover start condition among these multiple types of handover as the most effective one from a viewpoint of the radio channel capacity, and when the handover start condition for the selected handover type is satisfied, the mobile station notifies this fact to the base station so as to carry out the selected type of handover.

As can be seen from a level difference for judging the handover start for each handover type indicated in FIG. 3, the handover start condition is weakest for the same code same frequency soft handover, second weakest for the different frequency soft handover, and strongest for the hard handover among three types of handover available in this mobile communication system, and as already mentioned above, the memory 51 provided in the mobile station device stores these different handover start conditions for multiple types of handover along with an order of weakness among these handover start conditions.

At the mobile station, normally, whether the weakest handover start condition among the handover start conditions for multiple types of handover as stored in the memory 51, that is the handover start condition for the same code same frequency soft handover, is satisfied or not is regularly checked by the control unit 11, and when this handover start condition is satisfied, this fact is notified from the control unit 11 to the base station in a form of a control signal which is transmitted through the encoding unit 13, the modulation unit 15, the transmission unit 17, and the duplexer 3, so as to start the same code same frequency soft handover.

In addition, there are cases in which a certain base station cannot use a particular frequency or cannot carry out the soft handover so that only the hard handover is possible, and when a particular type of handover cannot be carried out at a certain base station because of the reason not changing in time such as that related to the system configuration, this base station notifies this fact to the mobile station in advance. Then, the mobile station judges and selects a handover type which has the weakest handover start condition among the available types of handover excluding the notified type of handover that cannot be carried out at the base station, and when the handover start condition for the selected handover type is satisfied, the mobile station notifies this fact to the base station so as to carry out the selected type of handover.

As one concrete example of this embodiment, the base station notifies the available frequency bandwidth of each surrounding cell/sector to the mobile station in advance, and the mobile station stores this available frequency bandwidth of each surrounding cell/sector notified from the base station into the memory 51. Then, the mobile station identifies each cell/sector at which the same code same frequency soft handover cannot be carried out according to the stored available frequency bandwidth, and makes the judgement of the handover start condition for the different frequency soft handover with respect to each identified cell/sector, without making the judgement of the handover start condition for the same code same frequency soft handover. Then, when the handover start condition for the different frequency soft handover is satisfied, the mobile station notifies this fact to the base station.

As another concrete example of this embodiment, when a certain base station cannot carry out the soft handover so that only the hard handover is possible, this base station notifies this fact to the mobile station in advance, and the mobile station stores this notification into the memory 51. Then, according to this stored notification, the mobile station makes the judgement of the handover start condition for the hard handover with respect to this base station, without making the judgement of the handover start condition for the soft handover. Then, when the handover start condition for the hard handover is satisfied, the mobile station notifies this fact to this base station.

Next, in another embodiment of a handover type judgement scheme according to the present invention, the mobile station measures the downlink radio channel state at the measurement unit 53, and judges whether it is possible to carry out each type of handover or not at the control unit 11 according to the measured value, in order to cope with a case in which a particular type of handover cannot be carried out because of the reason changing in time, as in a case where the interference receiving level of the frequency bandwidth currently used for the communication at the mobile station is greater than a prescribed threshold level and the radio channel capacity of this frequency bandwidth is already full so that the same code same frequency soft handover using this frequency bandwidth cannot be carried out.

Then, the mobile station judges and selects a handover type which has the weakest handover start condition among the available types of handover excluding the type of handover that has been judged as not possible to carry out, and when the handover start condition for the selected handover type is satisfied, the mobile station notifies this fact to the base station so as to carry out the selected type of handover.

As one concrete example of this embodiment, the mobile station measures the interference receiving level or the total receiving level of the frequency bandwidth which is currently used for the communication at the measurement unit 53, and compares the measured value with a prescribed threshold value at the control unit 11. Then, when the measured value is greater than the prescribed threshold value, the mobile station makes the judgement of the handover start condition for the different frequency soft handover, without making the judgement of the handover start condition for the same code same frequency soft handover using this frequency bandwidth, and when the handover start condition for the different frequency soft handover is satisfied, the mobile station notifies this fact to this base station.

Next, in another embodiment of a handover type judgement scheme according to the present invention, in order to cope with a case in which a particular type of handover cannot be carried out because of the reason changing in time such as the capacity overflow as described above, each base station measures the uplink radio channel state for each cell/sector at the measurement unit 55, judges whether it is possible to carry out each type of handover or not according to the measured value, and notifies an information on this judgement result to the surrounding base stations. Then, each surrounding base station notifies this information to the currently communicating mobile station.

Then, the mobile station judges and selects a handover type which has the weakest handover start condition among the available types of handover excluding the type of handover that has been judged as not possible to carry out with respect to a relevant cell/sector according to the notified information, and when the handover start condition for the selected handover type is satisfied, the mobile station notifies this fact to the base station so as to carry out the selected type of handover.

As one concrete example of this embodiment, each base station measures the interference receiving level or the total receiving level of each frequency bandwidth that is implemented at that base station, for each cell/sector at the measurement unit 55, and compares the measured value with a prescribed threshold value at the control unit 31. Then, when the measured value is greater than the prescribed threshold value, each mobile station notifies the fact that the frequency bandwidth corresponding to this measured value cannot be used to the surrounding base stations. Then, each surrounding base station notifies this notified frequency bandwidth that cannot be used to the currently communicating mobile station.

At the mobile station which received this notification and which is using this notified frequency bandwidth, the judgement of the handover start condition for the different frequency soft handover is made with respect to a relevant cell/sector, without making the judgement of the handover start condition for the same code same frequency soft handover using this frequency bandwidth, and when the handover start condition for the different frequency soft handover is satisfied, the mobile station notifies this fact to this base station.

Note here that the notification from the base station in this embodiment may be made only with respect to the mobile station which is currently using the relevant frequency bandwidth for the communication.

As described, according to the handover type judgement scheme of the present invention, the mobile station judges and selects a handover type which has the weakest handover start condition among the available multiple types of handover, and when the handover start condition for the selected handover type is satisfied, this fact is notified to the base station so as to carry out the selected type of handover. Consequently, the each type of handover among the available multiple types of handover can be carried out appropriately according to its handover start condition.

In addition, in a case where a particular type of handover cannot be carried out because of either the reason not changing in time such as that related to the system configuration or the reason changing in time such as the capacity overflow, this fact is notified in advance or such a case is detected. Then, the mobile station judges and selects a handover type which has the weakest handover start condition among the available types of handover excluding this particular type of handover that cannot be carried out, and when the handover start condition for the selected handover type is satisfied, this fact is notified to the base station so as to carry out the selected type of handover. Consequently, it is possible to realize an efficient handover type judgement scheme by eliminating an unnecessary judgement of the handover start condition for that particular type of handover that cannot be carried out as well as an unnecessary increase of the traffic due to the notification resulting from such an unnecessary judgement.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for judging a handover type at a mobile station of a CDMA mobile communication system which is capable of carrying out any of multiple types of handover with different handover start conditions, the method comprising the steps of:
   judging, at the mobile station, one type of handover with a handover start condition which is most easily met among available types of handover; and
   checking, at the mobile station, whether the handover start condition for said one type of handover is satisfied or not, and notifying, from the mobile station, each base station for carrying out said one type of handover when the handover start condition for said one type of handover is satisfied.

2. The method of claim 1, further comprising the step of:
   notifying from one base station to the mobile station in advance a particular type of handover among said multiple types of handover that cannot be carried out at said one base station;
   wherein at a time of handover with respect to said one base station, the judging step judges said one type of handover from said available types of handover which include said multiple types of handover except for said particular type of handover.

3. The method of claim 1, further comprising the steps of:
   notifying from one base station to the mobile station in advance an available frequency bandwidth for each surrounding cell/sector of said one base station; and
   determining one cell/sector for which a same code same frequency soft handover cannot be carried out according to the available frequency bandwidth for said one cell/sector as notified by the notifying step;
   wherein said multiple types of handover includes a same code same frequency soft handover and a different frequency soft handover, and at a time of handover with respect to said one cell/sector determined by the determining step, the judging step judges the different frequency soft handover as said one type of handover so that the checking step does not check the handover start condition for the same code same frequency soft handover with respect to said one cell/sector.

4. The method of claim 1, further comprising the steps of:
   notifying from one base station to the mobile station in advance an information as to whether a soft handover is possible or not with respect to each surrounding cell/sector of said one base station; and
   determining one cell/sector for which the soft handover is not possible according to the information for said one cell/sector as notified by the notifying step;
   wherein said multiple types of handover includes a soft handover and a hard handover, and at a time of handover with respect to said one cell/sector determined by the determining step, the judging step judges the hard handover as said one type of handover so that the checking step does not check the handover start condition for the soft handover with respect to said one cell/sector.

5. The method of claim 1, further comprising the steps of:
   measuring a radio channel state at the mobile station; and
   determining each impossible type of handover that cannot be carried out by the mobile station according to the radio channel state measured by the measuring step;
   wherein the judging step judges said one type of handover from said available types of handover which include said multiple types of handover except for said each impossible type of handover.

6. The method of claim 1, further comprising the step of:
   measuring an interference receiving level or a total receiving level of a frequency bandwidth currently used for communication at the mobile station;
   wherein said multiple types of handover includes a same code same frequency soft handover and a different frequency soft handover, and when a measured value obtained by the measuring step is greater than a prescribed threshold value, the judging step judges the different frequency soft handover as said one type of handover so that the checking step does not check the handover start condition for the same code same frequency soft handover.

7. The method of claim 1, further comprising the steps of:
   measuring a radio channel state for each cell/sector of each base station;
   determining each impossible type of handover that cannot be carried out for each cell/sector by said each base station according to the radio channel state measured by the measuring step; and notifying an information indicating said each impossible type of handover from said each base station to the mobile station;

wherein at a time of handover with respect to said each base station, the judging step judges said one type of handover from said available types of handover which include said multiple types of handover except for said each impossible type of handover according to said information.

8. The method of claim 7, wherein at the notifying step, said each base station notifies said information to surrounding base stations and the mobile station receives said information via one of said surrounding base stations with which the mobile station is currently communicating.

9. The method of claim 1, further comprising the steps of:

measuring an interference receiving level or a total receiving level of each frequency bandwidth that is implemented at each base station for each cell/sector of said each base station; and notifying an information indicating that one frequency bandwidth cannot be used for one cell/sector from said each base station to the mobile station, when a measured value for said one frequency bandwidth and said one cell/sector is greater than a prescribed threshold value;

wherein said multiple types of handover includes a same code same frequency soft handover and a different frequency soft handover, and at a time of handover with respect to said one cell/sector while the mobile station is currently using said one frequency bandwidth as indicated by said information, the judging step judges the different frequency soft handover as said one type of handover so that the checking step does not check the handover start condition for the same code same frequency soft handover with respect to said one cell/sector.

10. The method of claim 9, wherein at the notifying step, said each base station notifies said information to surrounding base stations and the mobile station receives said information via one of said surrounding base stations with which the mobile station is currently communicating.

11. A CDMA mobile communication system for carrying out any of multiple types of handover with different handover start conditions, comprising:

a plurality of base stations; and at least one mobile station having:
a judging unit for judging one type of handover with a handover start condition which is most easily met among available types of handover; and
a checking unit for checking whether the handover start condition for said one type of handover is satisfied or not, and notifying each base station for carrying out said one type of handover when the handover start condition for said one type of handover is satisfied.

12. The system of claim 11, wherein one base station has a notifying unit for notifying to the mobile station in advance a particular type of handover among said multiple types of handover that cannot be carried out at said one base station; and wherein at a time of handover with respect to said one base station, the judging unit judges said one type of handover from said available types of handover which include said multiple types of handover except for said particular type of handover.

13. The system of claim 11, wherein one base station has a notifying unit for notifying to the mobile station in advance an available frequency bandwidth for each surrounding cell/sector of said one base station;

the mobile station also has a determining unit for determining one cell/sector for which a same code same frequency soft handover cannot be carried out according to the available frequency bandwidth for said one cell/sector as notified by the notifying unit; and wherein said multiple types of handover includes a same code same frequency soft handover and a different frequency soft handover, and at a time of handover with respect to said one cell/sector determined by the determining unit, the judging unit judges the different frequency soft handover as said one type of handover so that the checking unit does not check the handover start condition for the same code same frequency soft handover with respect to said one cell/sector.

14. The system of claim 11, wherein one base station has a notifying unit for notifying to the mobile station in advance an information as to whether a soft handover is possible or not with respect to each surrounding cell/sector of said one base station;

the mobile station also has a determining unit for determining one cell/sector for which the soft handover is not possible according to the information for said one cell/sector as notified by the notifying unit; and wherein said multiple types of handover includes a soft handover and a hard handover, and at a time of handover with respect to said one cell/sector determined by the determining unit, the Judging unit judges the hard handover as said one type of handover so that the checking unit does not check the handover start condition for the soft handover with respect to said one cell/sector.

15. The system of claim 11, wherein the mobile station also has:

a measuring unit for measuring a radio channel state; and a determining unit for determining each impossible type of handover that cannot be carried out by the mobile station according to the radio channel state measured by the measuring unit; and wherein the judging unit judges said one type of handover from said available types of handover which include said multiple types of handover except for said each impossible type of handover.

16. The system of claim 11, wherein the mobile station also has:

a measuring unit for measuring an interference receiving level or a total receiving level of a frequency bandwidth currently used for communication; and wherein said multiple types of handover includes a same code same frequency soft handover and a different frequency soft handover, and when a measured value obtained by the measuring unit is greater than a prescribed threshold value, the judging unit judges the different frequency soft handover as said one type of handover so that the checking unit does not check the handover start condition for the same code same frequency soft handover.

17. The system of claim 11, wherein each base station has:

a measuring unit for measuring a radio channel state for each cell/sector of said each base station;

a determining unit for determining each impossible type of handover that cannot be carried out for each cell/sector by said each base station according to the radio channel state measured by the measuring unit; and a notifying unit for notifying an information indicating said each impossible type of handover to the mobile station; and wherein at a time of handover with respect to said each base station, the judging unit judges said one type of handover from said available types of handover which include said multiple types of handover except for said each impossible type of handover according to said information.

18. The system of claim 17, wherein the notifying unit notifies said information to surrounding base stations and the mobile station receives said information via one of said surrounding base stations with which the mobile station is currently communicating.

19. The system of claim 11, wherein each base station has:

a measuring unit for measuring an interference receiving level or a total receiving level of each frequency bandwidth that is implemented at said each base station for each cell/sector of said each base station; and a notifying unit for notifying an information indicating that one frequency bandwidth cannot be used for one cell/sector to the mobile station, when a measured value for said one frequency bandwidth and said one cell/sector is greater than a prescribed threshold value; and wherein said multiple types of handover includes a same code same frequency soft handover and a different frequency soft handover, and at a time of handover with respect to said one cell/sector while the mobile station is currently using said one frequency bandwidth as indicated by said information, the judging unit judges the different frequency soft handover as said one type of handover so that the checking unit does not check the handover start condition for the same code same frequency soft handover with respect to said one cell/sector.

20. The system of claim 19, wherein the notifying unit notifies said information to surrounding base stations and the mobile station receives said information via one of said surrounding base stations with which the mobile station is currently communicating.

21. A mobile station apparatus for use as a mobile station in a CDMA mobile communication system for carrying out any of multiple types of handover with different handover start conditions, the apparatus comprising:

a judging unit for judging one type of handover with a handover start condition which is most easily met among available types of handover; and a checking unit for checking whether the handover start condition for said one type of handover is satisfied or not, and notifying each base station for carrying out said one type of handover when the handover start condition for said one type of handover is satisfied.

22. The apparatus of claim 21, wherein at a time of handover with respect to one base station, the judging unit receives in advance a particular type of handover among said multiple types of handover that cannot be carried out at said one base station, and the judging unit judges said one type of handover from said available types of handover which include said multiple types of handover except for said particular type of handover.

23. The apparatus of claim 21, further comprising:

a determining unit for receiving from one base station in advance an available frequency bandwidth for each surrounding cell/sector of said one base station, and determining one cell/sector for which a same code same frequency soft handover cannot be carried out according to the available frequency bandwidth for said one cell/sector as notified from said one base station;

wherein said multiple types of handover includes a same code same frequency soft handover and a different frequency soft handover, and at a time of handover with respect to said one cell/sector determined by the determining unit, the judging unit judges the different frequency soft handover as said one type of handover so that the checking unit does not check the handover start condition for the same code same frequency soft handover with respect to said one cell/sector.

24. The apparatus of claim 21, further comprising:

a determining unit for receiving from one base station in advance an information as to whether a soft handover is possible or not with respect to each surrounding cell/sector of said one base station, and determining one cell/sector for which the soft handover is not possible according to the information for said one cell/sector as notified from said one base station; and wherein said multiple types of handover includes a soft handover and a hard handover, and at a time of handover with respect to said one cell/sector determined by the determining unit, the judging unit judges the hard handover as said one type of handover so that the checking unit does not check the handover start condition for the soft handover with respect to said one cell/sector.

25. The apparatus of claim 21, further comprising:

a measuring unit for measuring a radio channel state; and a determining unit for determining each impossible type of handover that cannot be carried out according to the radio channel state measured by the measuring unit; and wherein the judging unit judges said one type of handover from said available types of handover which include said multiple types of handover except for said each impossible type of handover.

26. The apparatus of claim 21, further comprising:

a measuring unit for measuring an interference receiving level or a total receiving level of a frequency bandwidth currently used for communication; and wherein said multiple types of handover includes a same code same frequency soft handover and a different frequency soft handover, and when a measured value obtained by the measuring unit is greater than a prescribed threshold value, the judging unit judges the different frequency soft handover as said one type of handover so that the checking unit does not check the handover start condition for the same code same frequency soft handover.

27. The apparatus of claim 21, wherein each base station measures a radio channel state for each cell/sector of said each base station, determines each impossible type of handover that cannot be carried out for each cell/sector by said each base station according to the radio channel state measured by said each base station, and notifies an information indicating said each impossible type of handover to the mobile station; and wherein at a time of handover with respect to said each base station, the judging unit receives said information and judges said one type of handover from said available types of handover which include said multiple types of handover except for said each impossible type of handover according to said information.

28. The apparatus of claim 27, wherein said each base station notifies said information to surrounding base stations and the judging unit receives said information via one of said surrounding base stations with which the mobile station is currently communicating.

29. The apparatus of claim 21, wherein each base station measures an interference receiving level or a total receiving level of each frequency bandwidth that is implemented at said each base station for each cell/sector of said each base station, and notifies an information indicating that one frequency bandwidth cannot be used for one cell/sector to the mobile station, when a measured value for said one frequency bandwidth and said one cell/sector is greater than a prescribed threshold value; and wherein said multiple types of handover includes a same code same frequency soft handover and a different frequency soft handover, and at a time of handover with respect to said one cell/sector while the mobile station is currently using said one frequency bandwidth as indicated by said information, the judging unit receives said information and judges the different frequency soft handover as said one type of handover so that the checking unit does not check the handover start condition for the same code same frequency soft handover with respect to said one cell/sector.

30. The apparatus of claim 29, wherein said each base station notifies said information to surrounding base stations and the judging unit receives said information via one of said surrounding base stations with which the mobile station is currently communicating.

31. The apparatus of claim 21, further comprising:
a memory for storing the handover start conditions of said multiple types of handover;
wherein the judging unit judges said one type of handover according to the handover start conditions stored in the memory.

32. The apparatus of claim 31, wherein the memory also stores an order of easiness for meeting the handover start conditions among said multiple types of handover.

33. A base station apparatus for use as a base station in a CDMA mobile communication system for carrying out any of multiple types of handover with different handover start conditions, the apparatus comprising:

a measuring unit for measuring a radio channel state for each cell/sector of the base station;

a determining unit for determining each impossible type of handover that cannot be carried out for each cell/sector by the base station according to the radio channel state measured by the measuring unit; and a notifying unit for notifying an information indicating said each impossible type of handover to a mobile station, so that at a time of handover with respect to the base station, the mobile station judges one type of handover with a handover start condition which is most easily met among available types of handover which include said multiple types of handover except for said each impossible type of handover according to said information, checks whether the handover start condition for said one type of handover is satisfied or not, and notifies each base station for carrying out said one type of handover when the handover start condition for said one type of handover is satisfied.

34. The apparatus of claim 33, wherein the notifying unit notifies said information to surrounding base stations and the mobile station receives said information via one of said surrounding base stations with which the mobile station is currently communicating.

35. A base station apparatus for use as a base station in a CDMA mobile communication system for carrying out any of multiple types of handover with different handover start conditions including a same code same frequency soft handover and a different frequency soft handover, the apparatus comprising:

a measuring unit for measuring an interference receiving level or a total receiving level of each frequency bandwidth that is implemented at the base station for each cell/sector of the base station; and a notifying unit for notifying an information indicating that one frequency bandwidth cannot be used for one cell/sector to a mobile station, when a measured value for said one frequency bandwidth and said one cell/sector is greater than a prescribed threshold value, so that at a time of handover with respect to said one cell/sector while the mobile station is currently using said one frequency bandwidth as indicated by said information, the mobile station judges the different frequency soft handover as having a most easily met handover start condition among available types of handover, checks whether the handover start condition for the different frequency soft handover is satisfied or not without checking the handover start condition for the same code same frequency soft handover with respect to said one cell/sector, and notifies each base station for carrying out the different frequency soft handover when the handover start condition for the different frequency soft handover is satisfied.

36. The apparatus of claim 35, wherein the notifying unit notifies said information to surrounding base stations and the mobile station receives said information via one of said surrounding base stations with which the mobile station is currently communicating.

* * * * *